United States Patent Office 3,062,652
Patented Nov. 6, 1962

3,062,652
HARDENING OF GELATIN WITH OXY PLANT GUMS
Roy A. Jeffreys and Bryan E. Tabor, Harrow, England, and Donald M. Burness, Rochester, N.Y., assignors to Eastman Kodak Company, Rochester, N.Y., a corporation of New Jersey
No Drawing. Filed June 24, 1959, Ser. No. 822,445
11 Claims. (Cl. 96—99)

This invention relates to the hardening of gelatin including gelatin-photographic emulsions by incorporating therein an oxidized polyuronide as obtained by the oxidation of a plant gum by an oxidation method which yields predominantly aldehyde groups and less than 12 percent of carboxyl groups, which hardener acts upon the layers coated from the coating compositions comprising gelatin in which it is contained.

One well-known oxidation method of this type utilizes, as the oxidant, a water-soluble periodate salt or the free acid itself.

Hardeners which have been commonly used for hardening gelatin, such as formaldehyde or chromic acid, have characteristics which are often times not desired. For instance, formaldehyde may have a derogatory effect upon photographic emulsions. Some hardeners which have been suggested heretofore as being useful for hardening purposes in gelatin coating compositions have been characterized by wandering from one layer to another. Not only have gelatin hardeners previously suggested in the prior art been guilty of causing deterioration of photographic emulsions, but also hardeners have been suggested which have exhibited a pronounced tendency to fog standard negative photographic emulsions. Also, hardeners have been suggested which when used in color photography have exhibited an effect upon couplers employed therein causing staining of the resulting products.

One object of our invention is to provide hardening agents for gelatin characterized by resistance to diffusion from one layer to another in those products in which the hardened gelatin layer is adjacent to a non-hardened layer of gelatin. Another object of our invention is to provide useful hardeners which do not cause deterioration of the sensitivity properties of photographic emulsions when used therein. A further object of our invention is to provide gelatin hardeners which are effective without the use of elevated temperatures. A still further object of our invention is to provide gelatin hardeners having improved characteristics as regards fogging of standard photographic emulsions and as regards inertness to color-forming couplers employed in the manufacture of multilayer films in color photography. Other objects of our invention will appear herein.

We have found that certain plant gums which have been subjected to controlled oxidation, e.g., periodate oxidation, whereby secondary alcohol groups in the gum are converted to aldehyde groups, exhibit excellent hardening properties when incorporated in gelatin coating compositions. We have found that oxidized polyuronides (aldehydro-polyuronides) as prepared from certain plant gums exhibit a hardening effect upon gelatin even when employed in small proportions therein. It is usually desirable to employ at least 0.5% of oxy polyuronide based on the weight of the gelatin. However, a convenient range of proportions for use of this hardener is 0.5–5% of the gelatin.

Oxidized polyuronides such as are useful in our invention are prepared by oxidation of selected plant gums with a periodate. This procedure involves oxidizing the gum with a dilute solution of a water-soluble salt of periodic acid, such as sodium periodate or the free acid. This may be accomplished by treating the gum with an aqueous solution of periodate or periodic acid, the treatment being either with the gum in suspension or in solution in the mass. Upon standing for a sufficient time, such as 24 hours, secondary alcohol groups in the gums are oxidized to aldehyde groups. In cases where the gum is somewhat resistant to aqueous solutions even longer times are often desirable. It is preferable that at least 80% of the secondary alcohol groups be converted to aldehyde groups although lesser amounts of oxidation will give products having a hardening effect, particularly where those less oxidized products are used in greater quantities to adjust for the lower state of oxidation.

After the oxidation has occurred the product is removed and thoroughly washed and dried. It is stable in storage for a considerable period. It is desirable in obtaining the products that they be subjected to treatment with an ion exchange resin to improve the characteristics of the products. The treatment of oxidized polyuronides to improve their characteristics by treating with ion exchange resins is the invention of Donald M. Burness and will be described in more detail and claimed in a separate application. In some cases the products obtained are not as readily soluble in water as in the case of other products which are prepared. In those cases it may be desirable to subject the product to some further treatment, such as by immersing it in sodium chlorite solution for several hours for a sufficient time to cause the introduction of some carboxyl content into the oxidized polyuronide.

Some of the plant gums which are useful as the starting materials for oxidizing with a water-soluble periodate or periodic acid to obtain oxidized polyuronides are gum acacia, gum tragacanth, guar gum, mesquite gum, alginic acid, damson gum or hemicellulose gums such as pectins or xylans. It has been found that these materials, when introduced into gelatin coating compositions, remain in the layer in which those materials have been incorporated even in cases where layers adjacent thereto consist of gelatin containing no hardening agent therein. The compounds of our invention may be incorporated in aqueous gelatin compositions or they may be incorporated in gelatin compositions comprising inorganic materials such as silver halide, barium sulfate or titanium dioxide.

It has been observed that when these hardening agents are used in gelatin silver halide photographic emulsions objectionable fogging is absent and when employed for hardening silver halide photographic emulsion layers comprising incorporated color-forming couplers and gelatin destined to be used in color photography staining is minimized or even avoided. We have also observed that the hardeners in accordance with our invention effectively increase the melting point of the gelatin layers without subjecting those layers to elevated temperature. For instance, layers of compositions in accordance with our invention after standing for a short time such as 3–7 days or more exhibit resistance to the dissolving effects of water at elevated temperatures.

In preparing oxy polyuronides which are useful as hardeners in accordance with our invention one convenient method of preparing those products is by subjecting the plant gum either in aqueous solution or in suspensions with the periodate or periodic acid to an electrolytic method of oxidation. By this method oxy polyuronides are obtained using smaller quantities of periodate in view of the continued regeneration of the periodate by the electrolysis procedure.

The following examples illustrate procedures for carrying out the preparation of oxy polyuronides and their use for hardening gelatin in accordance with our invention.

Example 1

50 grams of gum acacia was dissolved in 500 ccs. of water and 23 grams of 50% periodic acid solution was added. The mass was allowed to stand overnight. The calcium periodate remaining was filtered off and the product obtained was precipitated with tertiary-butanol, centrifuged, stirred with ethanol and filtered off. The material was washed with ether and dried under vacuum. 46 grams of oxy gum acacia was obtained in white solid form. This material was incorporated in a fine grain silver iodobromide emulsion containing 6–7% of gelatin and was coated out. After 7 days' keeping of the various layers they were tested for speed and melting point. The coatings were made on glass plates, the speeds are given in arbitrary units, being the step corresponding to a density of 0.2 above fog on an exposure wedge in which the exposure increases by 0.1 log units per step. In every example tested the fog level was no greater than that of the untreated emulsion. The emulsions were tested for melting point by immersing their layers in water and increasing the temperature to a point at which the emulsion layer was dissolved or disintegrated off from the material on which they were coated. After 7 days' ordinary keeping the following results were obtained:

|  | Speed | M.P. (° F.) |
|---|---|---|
| Untreated emulsion | 22 | 87 |
| Emulsion containing oxy gum acacia (0.3 g./l.) | 21.5 | 93 |
| Emulsion containing oxy gum acacia (1.0 g./l.) | 21.5 | 106 |
| Emulsion containing oxy gum acacia (3.1 g./l.) | 21 | over 200 |

Example 2

The preparation of oxy gum acacia as described in the preceding example was repeated with the exception that the oxy gum acacia was not only washed as described but was subjected to treatment with an ion exchange resin. The product obtained was employed for hardening photographic emulsions and was found to have good hardening properties without adversely affecting the speed of the emulsion.

Example 3

50 grams of powdered gum acacia was dissolved in 500 ml. of water and there was added with cooling 54 grams of periodic acid dihydrate in 50 ml. of water. The mixture was held at 25° C. for 20 hours, filtered and diluted with water to 1100 ml. This solution was passed through a bed of 350 ml. of ion exchange resin (Amberlite IR–45, free base form) which resin was contained in a 1¼" x 36" column. The effluent obtained was free of iodate and periodate and was concentrated to 750 grams, treated with activated carbon and was filtered. The resulting solution contained 4.2% of oxy gum acacia having an aldehyde content of 0.77%. The oxidation level (based on total secondary alcohol groups) was on the order of 85% This material was employed as a hardener in a high speed bromoiodide gelatin photographic emulsion in proportion of both 3.2% and 6.4%, based on the weight of the gelatin. Emulsion coatings therefrom were resistant to the effects of boiling water (212° F.) for 2 minutes. The coating was subjected to a temperature of 120° F. for 1 week and there was no appreciable increase in fog caused by the hardener. The melting temperature of the emulsion without hardener therein was 87° F.

Example 4

25 grams of standard citrus pectin which had been dried at 105° C. for 4 hours in vacuum was dissolved in 800 ml. of warm water. The solution was cooled to less than 20° C. and a solution of 28 grams of periodic acid dihydrate in 50 ml. of water was added thereto in dropwise manner. The mass was allowed to stand for 24 hours at 20° C. The solution resulting was filtered and passed through a 1" x 24" column containing 150 ml. of ion exchange resin as described in the preceding example. The effluent was concentrated on a 40° C. bath at reduced pressure, treated with decolorizing charcoal and filtered. The resulting solution contained 2.9% oxy pectin. The product had an aldehyde content of 0.57%. The oxidation level (based on total secondary alcohol groups) was on the order of 55%. This material was employed for hardening photographic emulsion layers. It was found that the addition of oxy pectin to emulsions both in percentages of 0.2% and 3.6% based on the weight of the gelatin appreciably increased the resistance of layers thereof to the effect of boiling water. Although the emulsion layers were subjected to 120° F. temperature for 1 week, it was found that the fogging characteristics were not adversely affected by the hardener.

Example 5

50 grams of guar gum was dispersed in 3000 ml. of water. There was added to this dispersion in a dropwise manner at a temperature below 15° C. a solution of 75 grams of periodic acid dihydrate in 500 ml. of water. The mass was stirred at 20° C. for 90 hours. The solid obtained was removed by decantation and washed with water until free of iodate ion. After a final wash with ethanol and drying, the product weighed 27.5 grams. On heating a 2 gram sample in 100 ml. of water, 85% thereof dissolved to give a 1.7% solution which was found to contain 0.35% aldehyde. The oxidation level (based on total secondary alcohol groups) was on the order of 52%. This material was employed as a hardener in photographic emulsion compositions, both as 1.5% and 3% (based on the weight of the gelatin) additions to emulsions. Layers of the original emulsion were melted by water at 68° F., whereas layers of the emulsions containing oxy guar gum hardener were resistant to melting by water at 212° F. for a period of 2 minutes. The emulsion layers were subjected to a 120° F. temperature for 1 week and it was found that the hardener caused no more increase in fogging characteristics than was obtained by heating the unhardened emulsion.

Example 6

50 grams of gum acacia was dissolved in 500 ml. of water and the material was oxidized with 15 ml. of 50% periodic acid in the manner described in Example 3. The solution was filtered and without dilution was poured into 1200 ml. of tert-butanol with stirring. The mass was subjected to centrifuging and the solid thus obtained was washed with ethanol and ice water until free of iodate ion. Further washing with tert-butanol, ethanol and ether produced 37 grams of oxy gum acacia found to contain 7.2% aldehyde. The oxidation level (based on total secondary alcohol groups) was on the order of 35%. This material is useful when incorporated as a hardener for gelatin in coating compositions thereof and does not adversely affect photographic emulsions containing it.

Example 7

23.7 grams of freshly precipitated alginic acid was oxidized by periodic acid by the procedure described by Lucas and Stewart, J.A.C.S. 62, 1792 (1940). The product was given a preliminary wash with a mixture of water and tert-butanol. The product was then dispersed in 700 ml. of water and was filtered and was passed through a 1" x 12" column of an ion exchange resin (Amberlite IR–45, free base form). This treatment was effective in removing ionic impurities from the product. The effluent therefrom was concentrated to 510 grams giving a 2.6% solution of oxy alginic acid. This material which contained 0.70% aldehyde corresponding to 81% oxidation was useful as a hardener in gelatin coating compositions.

Example 8

A mixture of 66 grams of periodic acid dihydrate, 15 grams of sodium acetate, 25 grams of xylan and 525 ml. of water was stirred for 42 hours at 20° C. The liquid was obtained by centrifuging and was filtered, diluted to 1400 ml. and passed through a column containing 300 ml. of Amberlite IRA–400 in the acetate form. The effluent thus obtained was concentrated to 415 grams on a 40° bath giving oxy xylan useful as a hardener for gelatin as the product.

Example 9

A suspension of 11.6 grams of oxy guar gum prepared in accordance with the process described in Example 5 was added to a solution of 5.7 grams of sodium chlorite and 1.9 grams of acetic acid in 90 ml. of water. The mass was stirred for 16 hours at 24° C. More water was then added, $N_2$ was bubbled through for 2 hours and the slurry was poured into 180 ml. of ethanol to precipitate out the carboxy oxy guar gum which had formed. The product was separated from the liquid and was washed with 50% ethanol, then with ether followed by drying. The colorless solid obtained (11.2 grams) dissolved in water to give a colorless solution. The CHO content was slightly lower than that of the oxy guar gum employed as the starting material.

The carboxy oxy guar gum was added to a fast, negative type gelatin-silver halide photographic emulsion in 2.2% and 4.4% concentrations. The melting points of layers coated therefrom were 156° F. and 191° F., respectively.

Several of the hardeners described above were tested by incorporation in a high-speed bromiodide photographic emulsion which was optically sensitized to the region of 5000–6000 Angstrom units and in addition contained a magenta dye-forming coupler suitably dispersed in a high-boiling organic solvent. The emulsion composition was applied as a coating onto conventional cellulose triacetate film support. The film coatings were exposed on an Eastman Type Ib sensitometer for $\frac{1}{50}$ second to the light emitted by a 500 watt lamp adjusted to 6100 K and further modulated by a Wratten #15 filter. The exposed strips were processed in the Kodak E–2 Ektachrome process. Melting points of the above layers were taken on the raw stock by immersing in a 2% aqueous sodium carbonate solution and increasing the temperature to the point at which disintegration and melting took place. In one set of emulsion samples the product described in Example 3 was adjusted in percentages of 1.35, 2, 2.7 and 3.4, based on the weight of the gelatin. The maximum densities obtained were 3.32, 3.42, 3.32 and 3.40 respectively. Relative speeds were 100, 91, 100 and 87 respectively and melting points were 40° C., 45° C., 65° C. and 75° C., respectively.

There was added to samples of a color emulsion oxy pectin (as described in Example 4) in concentrations of 4% and 6%, based on the weight of the gelatin. The maximum densities of emulsion layers from each were greater than 4.0, the relative speeds were 115 and 91, respectively, and the melting points were 65° C. and 75° C., respectively. Oxy guar gum prepared as described in Example 5 was added in proportions of 4% and 6%, based on the weight of the gelatin. Emulsion layers were coated out and tested as described. The maximum densities were greater than 4.0, the reltative speds were 83 for each and the melting points were 80° C. and greater than 100° C. for the respective emulsion layers. Oxy alginic acid as described in Example 7 was added to the referred to emulsion in a 2% proportion based on the weight of the gelatin. The maximum density was 3.90, the relative speed was 100 and the melting point was 45° C. A third emulsion used was a high speed bromoiodide emulsion optically sensitized to 5000–6000 Angstrom units and containing therein a magenta dye-forming coupler dispersed in a high boiling solvent. Oxy gum acacia as described in Example 6 was added to samples of the emulsion in proportions of 2% and 4%, based on the weight of the gelatin. The maximum densities were 3.33 and 3.50 respectively, the relative speeds of both were 100 and the melting points were 45° C. and 70° C., respectively.

The products used as hardeners are dialdehydepolyuronides, in that the units in the polymeric structure that contain adjacent secondary alcohol groups suffer cleavage of the carbon-to-carbon bond and the formation of two aldehyde groups at that point, upon the preferred oxidation, e.g., periodate oxidation, of the plant gum.

The photographic emulsions used in practicing our invention are of the developing-out type.

The emulsions can be chemically sensitized by any of the accepted procedures. The emulsions can be digested with naturally active gelatin, or sulfur compounds can be added such as those described in Sheppard U.S. Patent 1,574,944, issued March 2, 1926, Sheppard et al., U.S. Patent 1,623,499, issued April 5, 1927, and Sheppard et al. U.S. Patent 2,410,689, issued November 5, 1946.

The emulsions can also be treated with salts of the noble metals such as ruthenium, rhodium, palladium, iridium, and platinum. Representative compounds are ammonium chloropalladate, potassium chloroplatinate, and sodium chloropalladite, which are used for sensitizing in amounts below that which produces any substantial fog inhibition, as described in Smith and Trivelli U.S. Patent 2,448,060, issued August 31, 1948, and as antifoggants in higher amounts, as described in Trivelli and Smith U.S. Patents 2,566,245, issued August 28, 1951, and 2,566,263, issued August 28, 1951.

The emulsions can also be chemically sensitized with gold salts as described in Waller et al. U.S. Patent 2,399,083, issued April 23, 1946, or stabilized with gold salts as described in Damschroder U.S. Patent 2,597,856, issued May 27, 1952, and Yutzy and Leermakers U.S. Patent 2,597,915, issued May 27, 1952. Suitable compounds are potassium chloroaurite, potassium aurithiocyanate, potassium chloroaurate, auric trichloride, and 2-aurosulfobenzothiazole methochloride.

The emulsions can also be chemically sensitized with reducing agents such as stannous salts (Carroll U.S. Patent 2,487,850, issued November 15, 1949), polyamines, such as diethyl triamine (Lowe and Jones U.S. Patent 2,518,698, issued August 15, 1950), polyamines, such as spermine (Lowe and Allen U.S. Patent 2,521,925, issued September 12, 1950), or bis($\beta$-aminoethyl) sulfide and its water-soluble salts (Lowe and Jones U.S. Patent 2,521,926, issued September 12, 1950).

The emulsions can also be optically sensitized with cyanine and merocyanine dyes, such as those described in Brooker U.S. Patents 1,846,301, issued February 23, 1932; 1,846,302, issued February 23, 1932; and 1,942,854, issued January 9, 1934; White U.S. Patent 1,990,507, issued February 12, 1935; Brooker and White U.S. Patents 2,112,140, issued March 22, 1938; 2,165,338, issued July 11, 1939; 2,493,747, issued January 10, 1950, and 2,739,964, issued March 27, 1956; Brooker and Keyes U.S. Patent 2,493,748, issued January 10, 1950; Sprague U.S. Patents 2,503,776, issued April 11, 1950, and 2,519,001, issued August 15, 1950; Heseltine and Brooker U.S. Patent 2,666,761, issued January 19, 1954; Heseltine U.S. Patent 2,734,900, issued February 14, 1956; Van Lare U.S. Patent 2,739,149, issued March 20, 1956; and Kodak Limited British Patent 450,958, accepted July 15, 1936.

The emulsions can also be stabilized with the mercury compounds of Allen, Byers and Murray U.S. Patent 2,728,663, issued December 27, 1955; Carroll and Murray U.S. Patent 2,738,665, issued December 27, 1955; and Leubner and Murray U.S. Patent 2,728,665, issued December 27, 1955; the triazoles of Heimbach and Kelly U.S. Patent 2,444,608, issued July 6, 1948; the azaindenes of Heimbach and Kelly U.S. Patents 2,444,605 and 2,444,606, issued July 6, 1948; Heimbach U.S. Patents 2,444,607, issued July 6, 1948, and 2,450,397, issued September 28, 1948; Heimbach and Clark U.S. Patent 2,444,609, issued July 6, 1948; Allen and Reynolds U.S. Patents 2,713,541, issued July 19, 1955, and 2,743,181, issued April 24, 1956; Carroll and Beach U.S. Patent 2,716,062, issued August 23, 1955; Allen and Beilfuss U.S. Patent 2,735,769, issued February 21, 1956; Reynolds and Sagal U.S. Patent 2,756,147, issued July 24, 1956; Allen and Sagura U.S. Patent 2,772,164, issued November 27, 1956, and those disclosed by Birr in "Z. wiss. Phot.," vol. 47, 1952, pages 2–28; the disulfides of Kodak Belgian Patent 569,317, issued July 31, 1958; the quaternary benzothiazolium compounds of Brooker and Staud U.S. Patent 2,131,038, issued September 27, 1938, or the polymethylene bis-benzothiazolium salts of Allen and Wilson U.S. Patent 2,694,716, issued November 16, 1954; or the zinc and cadmium salts of Jones U.S. Patent 2,839,405, issued June 17, 1958.

The emulsions may also contain speed-increasing compounds of the quaternary ammonium type of Carroll U.S. Patent 2,271,623, issued February 3, 1942; Carroll and Allen U.S. Patent 2,288,226, issued June 30, 1942; and Carroll and Spence U.S. Patent 2,334,864, issued November 23, 1943; and the polyethylene glycol type of Carroll and Beach U.S. Patent 2,708,162, issued May 10, 1955.

The emulsions may contain a suitable gelatin plasticizer such as glycerin; a dihydroxy alkane such as 1,5-pentane diol as described in Milton and Murray U.S. application Serial No. 588,951, filed June 4, 1956; an ester of an ethylene bis-glycolic acid such as ethylene bis(methyl glycolate) as described in Milton U.S. application Serial No. 662,564, filed May 31, 1957; bis-(ethoxy diethylene glycol) succinate as described in Gray U.S. application Serial No. 604,333, filed August 16, 1956, or a polymeric hydrosol as results from the emulsion polymerization of a mixture of an amide of an acid of the acrylic acid series, an acrylic acid ester and a styrene-type compound as described in Tong U.S. Patent 2,852,386, issued September 16, 1958. The plasticizer may be added to the emulsion before or after the addition of a sensitizing dye, if used.

The emulsions may contain a coating aid such as saponin; a lauryl or oleyl monoether of polyethylene glycol as described in Knox and Davis U.S. Patent 2,831,766, issued April 22, 1958; a salt of a sulfated and alkylated polyethylene glycol ether as described in Knox and Davis U.S. Patent 2,719,087, issued September 27, 1955; an acylated alkyl taurine such as the sodium salt of N-oleoyl-N-methyl taurine as described in Knox, Twardokus and Davis U.S. Patent 2,739,891, issued March 27, 1956; the reaction product of a dianhydride of tetracarboxybutane with an alcohol or an aliphatic amine containing from 8 to 18 carbon atoms which is treated with a base, for example, the sodium salt of the monoester of tetracarboxybutane as described in Knox, Stenberg and Wilson U.S. Patent 2,843,487, issued July 15, 1958; a water-soluble maleopimarate or a mixture of a water-soluble maleopimarate and a substituted glutamate salt as described in Knox and Fowler U.S. Patent 2,823,123, issued February 11, 1958; an alkali metal salt of a substituted amino acid such as disodium N-(carbo-p-tert. octylphenoxypentaethoxy)-glutamate as described in Knox and Wilson U.S. patent application Serial No. 600,679, filed July 30, 1956; or a sulfosuccinamate such as tetrasodium N-(1,2-dicarboxy-N-octadecyl) sulfosuccinamate or N-lauryl disodium sulfosuccinamate as described in Knox and Stenberg U.S. patent application Serial No. 691,125, filed October 21, 1957.

The oxidized plant gum hardeners which we have described may be used in various kinds of photographic emulsions. In addition to being useful in X-ray and other nonoptically sensitized emulsions they may also be used in orthochromatic, panchromatic, and infrared sensitive emulsions. They may be added to the emulsion before or after any sensitizing dyes which are used. Various silver salts may be used as the sensitive salt such as silver bromide, silver iodide, silver chloride, or mixed silver halides such as silver chlorobromide or silver bromoiodide. The agents may be used in emulsions intended for color photography, for example, emulsions containing color-forming couplers or emulsions to be developed by solutions containing couplers or other color-generating materials, emulsions of the mixed-packet type, such as described in Godowsky U.S. Patent 2,698,794, issued January 4, 1955; or emulsions of the mixed-grain type, such as described in Carroll and Hanson U.S. Patent 2,592,243, issued April 8, 1952. These agents can also be used in emulsions which form latent images predominantly on the surface of the silver halide crystal or in emulsions which form latent images predominantly inside the silver halide crystal, such as those described in Davey and Knott U.S. Patent 2,592,250, issued April 8, 1952.

These may also be used in emulsions intended for use in diffusion transfer processes which utilize the undeveloped silver halide in the nonimage areas of the negative to form a positive by dissolving the undeveloped silver halide and precipitating it on a receiving layer in close proximity to the original silver halide emulsion layer. Such processes are described in Rott U.S. Patent 2,352,014, issued June 20, 1944, and Land U.S. Patents 2,584,029, issued January 29, 1952; 2,698,236, issued December 28, 1954, and 2,543,181, issued February 27, 1951; and Yackel et al. U.S. patent application Serial No. 586,705, filed May 23, 1956. They may also be used in color transfer processes which utilize the diffusion transfer of an image-wise distribution of developer, coupler or dye, from a light-sensitive layer to a second layer, while the two layers are in close proximity to one another. Color processes of this type are described in Land U.S. Patents 2,559,643, issued July 10, 1951, and 2,698,798, issued January 4, 1955; Land and Rogers Belgian Patents 554,933 and 554,934, granted August 12, 1957; International Polaroid Belgian Patents 554,212, granted July 16, 1957, and 554,935, granted August 12, 1957; Yutzy U.S. Patent 2,756,142, granted July 24, 1956, and Whitmore and Mader U.S. patent application Serial No. 734,141, filed May 9, 1958.

Combinations of these antifoggants, sensitizers, hardeners, etc., may be used.

We claim:

1. A composition of matter comprising gelatin containing as a hardener therein 0.5–5%, based on the weight of the gelatin, of the product obtained by the periodate oxidation of plant gum.

2. A gelatin-silver halide photographic emulsion containing as a hardener therein 0.5–5%, based on the weight of the gelatin, of the product obtained by the periodate oxidation of plant gum.

3. A composition of matter comprising gealtin containing as a hardener therein 0.5–5%, based on the weight of the gelatin, of the product obtained by the periodate oxidation of guar gum.

4. A composition of matter comprising gelatin containing as a hardener therein 0.5–5%, based on the weight of the gelatin, of the product obtained by the periodate oxidation of gum acacia.

5. A composition of matter comprising gelatin containing as a hardener therein 0.5–5%, based on the weight of the gelatin, of the product obtained by the periodate oxidation of pectin.

6. A composition of matter comprising gelatin containing as a hardener therein 0.5–5%, based on the weight of the gelatin, of the product obtained by the periodate oxidation of alginic acid.

7. A composition of matter comprising gelatin containing as a hardener therein 0.5–5%, based on the weight of the gelatin, of the product obtained by the periodate oxidation of xylan.

8. A gelatin-silver halide photographic emulsion containing therein a color-forming coupler and as a hardener therein 0.5-5%, based on the weight of the gelatin, of the product obtained by the periodate oxidation of plant gum.

9. A gelatin-silver halide photographic emulsion containing therein a color-forming coupler and as a hardener therein 0.5-5%, based on the weight of the gelatin, of the product obtained by the periodate oxidation of guar gum.

10. A gelatin-silver halide photographic emulsion containing as a hardener therein 0.5-5%, based on the weight of the gelatin, of the product obtained by the periodate oxidation of a plant gum and, in addition, a dye-developer compound, said compound being both a dye and a silver halide developing agent.

11. A composition of matter comprising gelatin containing as a hardener therein 0.5-5%, based on the weight of the gelatin, of the product obtained by the periodate oxidation of plant gum and, in addition, a dye-developer compound, said compound being both a dye and silver halide developing agent.

References Cited in the file of this patent

UNITED STATES PATENTS

| 2,059,817 | Sheppard et al. | Nov. 3, 1936 |
| 2,472,590 | Kenyon et al. | June 7, 1949 |

OTHER REFERENCES

Chemistry of Organic Compounds, Noller, 1957, W. B. Sanders.

Hackh's Chemical Dictionary, third edition, 1944, McGraw-Hill Book Company, page 392.

Mees: Theory of Photographic Process, 1942, Macmillan pub., pages 118-121.

Lucas et al.: J.A.C.S. 62, page 1792, 1940.